United States Patent [19]

Cowles et al.

[11] 4,213,729
[45] Jul. 22, 1980

[54] VEHICLE ATTACHED CARRIER PIVOTABLE ABOUT PLURAL AXES

[75] Inventors: Clarence W. Cowles, Placentia, Calif.; James C. Breashears, Amarillo, Tex.; Edwin M. Mungons, Toledo, Ohio

[73] Assignee: Eugene Wilmoth, Westland, Mich.

[21] Appl. No.: 873,054

[22] Filed: Jan. 27, 1978

[51] Int. Cl.² .............................................. B60R 9/00
[52] U.S. Cl. ............................ 414/462; 224/42.03 B; 224/42.08; 224/42.44; 414/482
[58] Field of Search .................. 224/42.03 B, 42.03 R, 224/42.07, 42.08, 42.45 R, 42.46 R, 42.43, 42.44, 29 R, 273; 214/450, 501, 505, 85, 701 R, 75 T, 701 P, 75 R, 701 Q; 296/57 R, 50; 414/469, 462, 482

[56] References Cited

U.S. PATENT DOCUMENTS

| | | | |
|---|---|---|---|
| 2,494,411 | 1/1950 | Simi | 214/453 |
| 3,348,713 | 10/1967 | Will | 214/450 |
| 3,528,578 | 9/1970 | Schoenberger | 214/450 |
| 3,655,082 | 4/1974 | Garrett | 214/450 |
| 3,724,694 | 4/1973 | Wilson | 214/450 |
| 3,796,333 | 3/1974 | Goldstein | 224/42.03 B X |
| 3,937,376 | 2/1976 | Ewing | 224/42.08 |

Primary Examiner—Jerold M. Forsberg
Attorney, Agent, or Firm—George R. Royer

[57] ABSTRACT

A multi-purpose carrier for external attachment to a land vehicle, said carrier conceived for carrying objects which are too large or cumbersome to carry inside the vehicle. The carrier comprises a retractable platform which holds the objects, wherein the platform is rotatably pivotable through two separate movements; one such rotational movement being about an axis which is parallel to the longitudinal front-to-rear central axis of the land vehicle, and by this latter rotational movement the carrying platform is lowered at an angle with one end juxtaposed adjacent the ground near the vehicle so that an inclined plane is formed to facilitate the loading movement of the object onto the platform from the ground, and from this latter inclined position the carrying platform is then rotated upwardly to a level position for the carrying position. The other rotational movement of the carrying platform is about a transverse axis which is perpendicular to the longitudinal front-to-rear central axis of the vehicle. This latter rotational movement is used to tilt the platform, when empty, into an upright vertical position adjacent the side of the land vehicle for storage positioning when not used.

3 Claims, 8 Drawing Figures

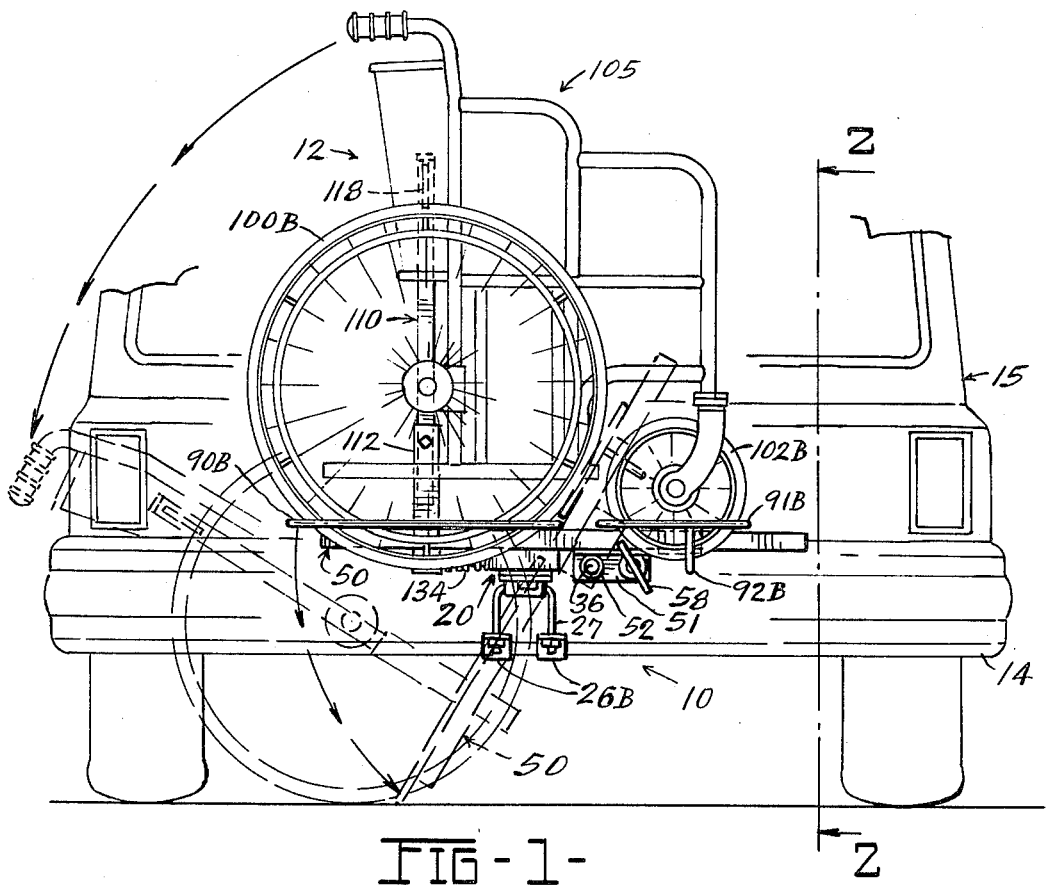
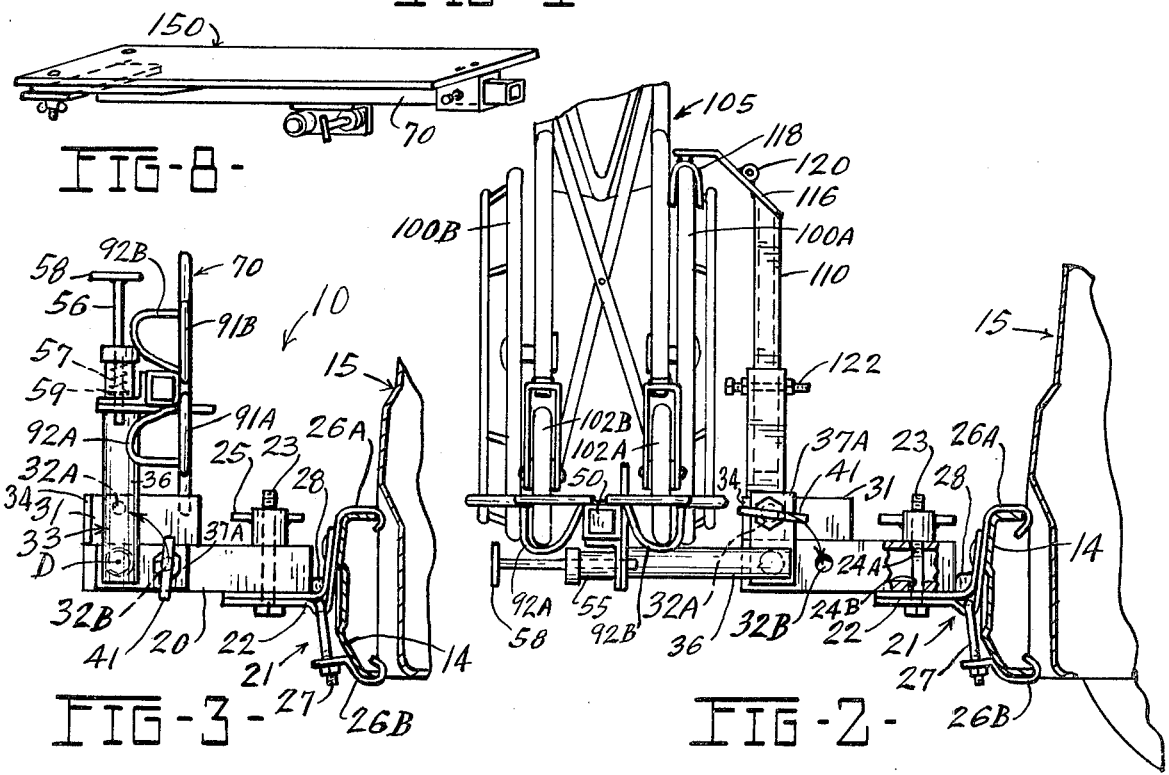

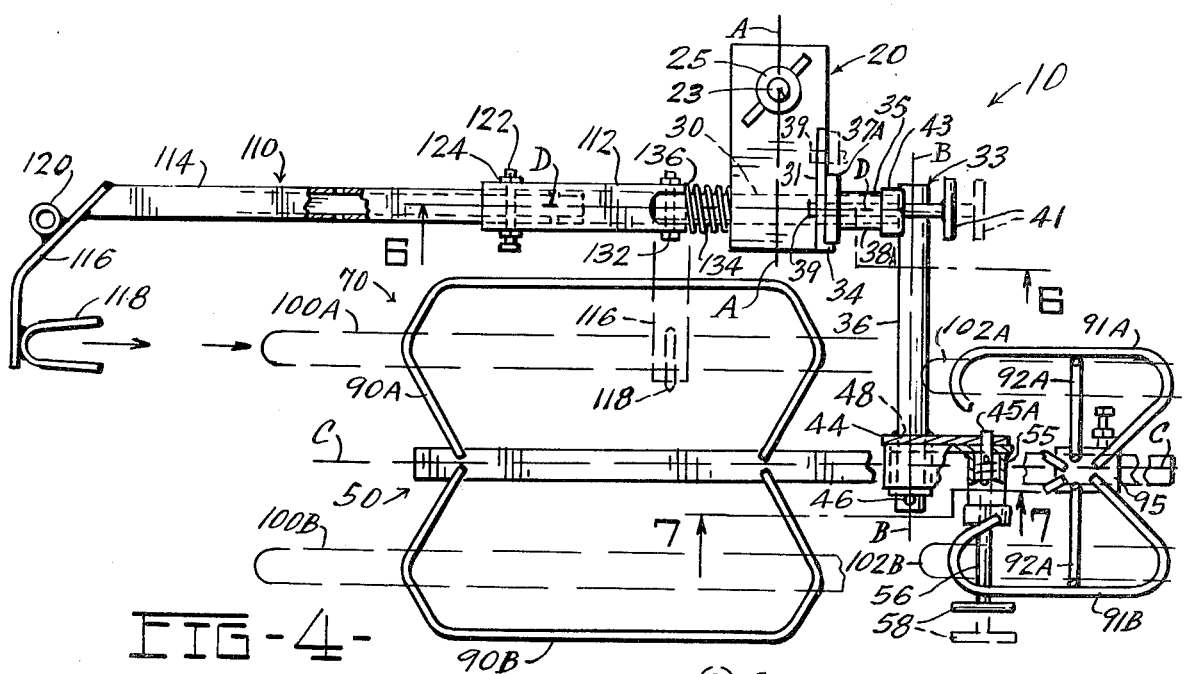
FIG-4-
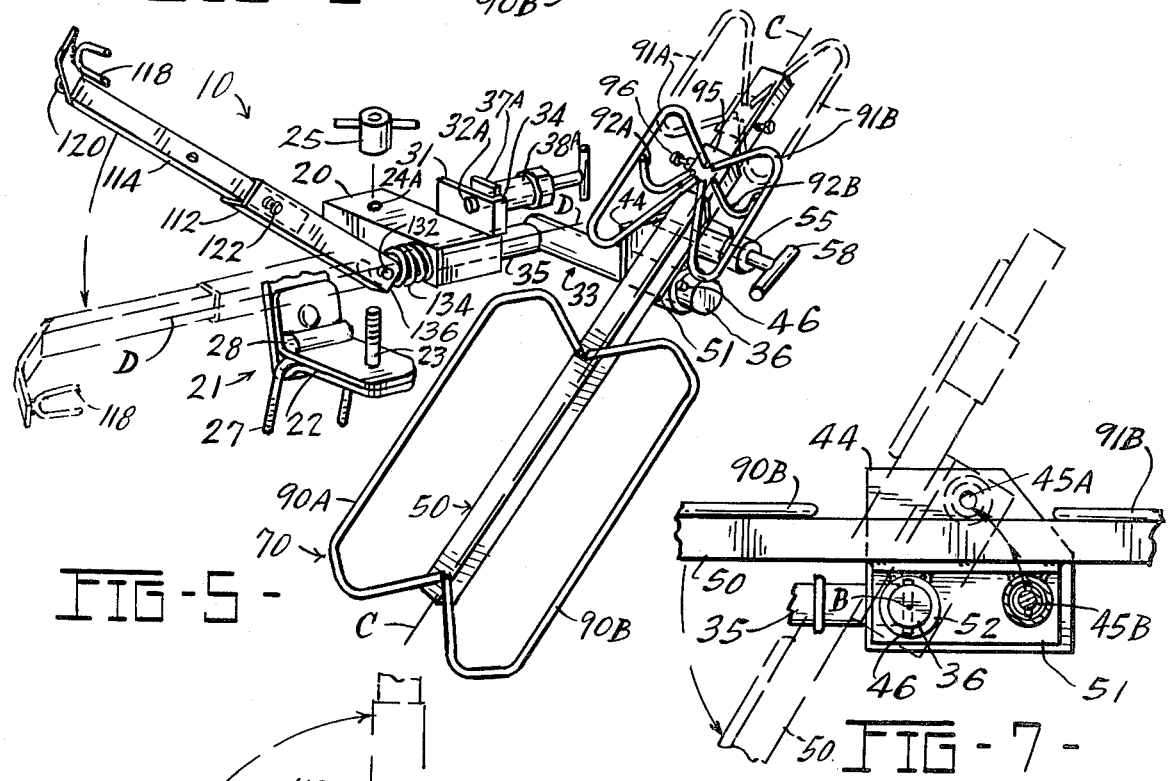
FIG-5-
FIG-7-
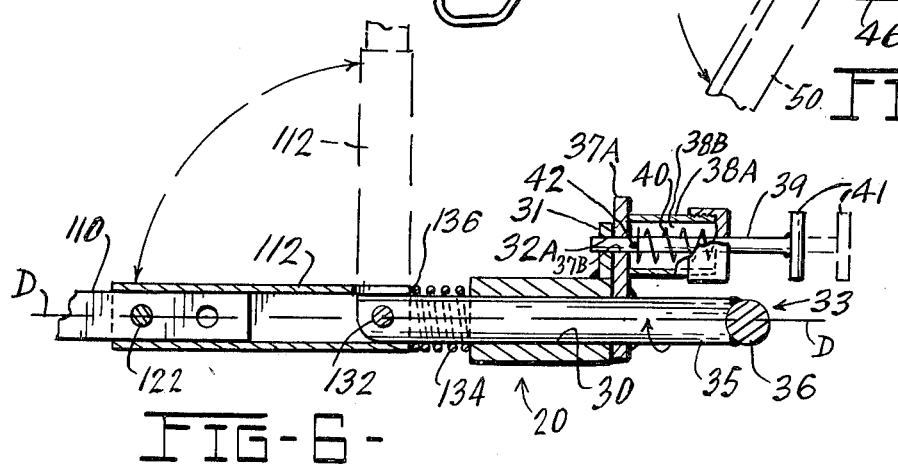
FIG-6-

VEHICLE ATTACHED CARRIER PIVOTABLE ABOUT PLURAL AXES

BACKGROUND OF INVENTION

Land vehicles are generally designed and structured primarily to carry objects and people inside the vehicle structure. Objects can be carried in either the passenger compartment or in the baggage section or trunk of the automobile. These are obvious functions of most land vehicles. However, land vehicles, and more specifically automobiles, have been used frequently to carry objects externally to the trunk or passenger compartment areas under diverse means and conditions. In this latter regard, some objects are either too large or are not appropriately structured for being carried in the passenger compartment or trunk. Rooftop carriers have been commonly and frequently utilized almost from the inception of the motor vehicle; and such rooftop carriers are used to carry either superfluous objects or those which cannot fit elsewhere in the automobile. Additionally, at times, vehicles such as automobiles have been temporarily rigged to carry objects on the front or side of the automobile, using in such cases external devices to hold the object closely to that area of the vehicle. Moreover, the very rear of a vehicle is used at times as a location for carrying objects, again with the aid of some appurtenance permanently or semi-permanently affixed to the vehicle.

There have been a myriad of vehicle attachments for the rooftop, side, front or rear end type carriers; and the structure, alignment, and positioning of these carriers have generally depended on the exact type of object that the carrier is designed to accommodate. For example, rooftop carriers have been designed and structured to carry relatively light objects, such as luggage, boxes and the like which can be fitted easily onto the rooftop. Carriers structured for use on the rear of a vehicle are used for many purposes, such as bicycles, small vehicles, light motorcycles, and similarly structured objects which do not lend themselves readily to being carried on a vehicle roof or other areas because of their cumbersome shape or weight characteristics. One of the other problems encountered with the utilization of roof type carriers is that modern automotive vehicles often have small, somewhat inclined roofs which are not compatible for installation of a roof carrier. Consequently, resort is often necessarily made to the use of an external carrier device on other areas of the vehicle, and in this regard only the rear end of a vehicle is feasible for an appendage as a carrier which is structured to carry fairly large or cumbersome objects. The sides and front of a vehicle have obvious limitations in this latter regard.

In considering and reviewing the array of all the carriers structured for use on the rear of any vehicle such as automobiles, generally all require that the object to be borne on the carrying platform be physically lifted by an individual's own efforts up and onto the platform itself. Thus, if a person of minimal or limited strength must lift an object which is cumbersome or of substantial weight, it may either be impossible or most difficult to lift the object onto the carrying platform. Indeed, the lifting of any object of any substantial weight or awkward construction by any person may involve a risk of physical injury which may be perilous. Furthermore, most existent carrier devices for the rear end of a vehicle are not readily and completely storable into a compact, unobtrusive device when not it use.

In light of the foregoing state of the art of external vehicle carriers, there is a need for a carrier which is strongly constructed and which will facilitate the lifting of the object onto the carrier; and which carrier can be easily retracted into an unobtrusive and compact storage position when not in use, and thence be readily unfoldable from this storage position for actual use. This invention is directed to this end, as discussed above.

OBJECTS

In view of the foregoing discussion of the prior art, the following are objects of the subject invention:

It is an object of this invention to provide an improved object carrier or external attachment to a land vehicle;

Another object of the subject invention is to provide an improved carrier for objects for placement at the rear of a land vehicle;

Still another object of the subject invention is to provide an automobile carrier which by its own structure facilitates the loading of objects to be carried thereon;

A further object of the subject invention is to provide an improved externally disposed carrier for a vehicle;

Another object of the subject invention is to provide a flexible carrier for objects which can be attached to an automobile or other land vehicle;

Yet another object of the subject invention is to provide a carrier for the rear of an automobile or other land vehicle which is easily and readily retractable into a compact position when not in use;

Another object of the subject invention is to provide an improved carrier for a vehicle;

Yet another object of the subject invention is to provide an improved vehicle appurtenance for carrying items;

Other objects of the subject invention will become apparent from a reading of the following drawings taken in conjunction with the specifications.

DRAWINGS

FIG. 1 is an elevational view of a perferred embodiment of the subject invention, shown from the rear of the vehicle, with a view in phantom of the carrying platform rotated downwardly to an inclined position with the one end thereof being juxtaposed adjacent the ground near the rear of the vehicle;

FIG. 2 is a side elevational view of the subject invention, shown partly in section; showing a wheelchair carried on the carrying platform;

FIG. 3 is a side elevational view, partly in section, showing the carrying assembly comprising the subject invention connecting the vehicle and the carrier;

FIG. 4 is a top elevational view of the subject invention, shown partly in section;

FIG. 5 is a perspective view of the subject invention showing the carrying platform in the tilted down position;

FIG. 6 is a side elevational view of the locking arm, shown in section;

FIG. 7 is a side elevational view, in section, of the flange assembly structured to control the rotational movement of the carrier platform movement to the ground;

FIG. 8 is a perspective view of an alternate embodiment of carrying platform.

DESCRIPTION OF GENERAL EMBODIMENT

The subject invention is a multi-purpose carrier for a vehicle structured for carrying sundry objects thereon, and which objects are to be removed and placed on such carrier with relative facility because of the unique structural features of the subject invention. This invention and the structural principles incorporated therein are adaptable as a carrier that can be affixed to either the front, sides or rear of any land vehicle. Thus, while the preferred embodiment of the subject invention, as described hereinbelow, is directed towards the implementation and utilization of a carrier on the rear end of a conventional motor vehicle, its scope of application will be, as stated above, more widely applicable. The following description of a general embodiment is therefore directed to this wider compass of applicablility.

In the general embodiment of the subject invention, the multi-purpose carrier incorporating the physical principles described herein is comprised basically of a carrying platform which is capable of being moved through several rotational movements and series of planar relationships in order to incorporate its unique loading, holding and storage, functions described herein. Each such planar movement and position is thus functionally related to respective loading, holding and storage positioning functions. In particular, one end of the carrying platform is adapted to be tilted and lowered in an inclined position so that such end so lowered either touches the ground or is relatively close thereto. In this inclined position, the carrying platform plane is thus set at an acute angle with the ground. In more direct parlance, in this tilted relationship, the carrying platform is angled to form an inclined plane from such lowered end upwardly from the ground. While the carrying platform is in this inclined position, the object to be carried is moved onto the platform for the loading stage. This inclined relationship aids in this loading process. Then, once the object is fully placed on the carrying platform, the carrying platform, by virtue of its pivotal and balanced structural relationship, is easily tilted back up to the horizontal carrying position with the object thereon. This carrying platform is pivotably mounted, as stated above, so that it can thence be rotated upwardly from this inclined position, with the object to be carried resting thereon, so that the plane of said carrying platform becomes substantially parallel to the ground. This level, parallel relationship, as just described, is the basic position of the carrying platform while the object is carried, whether the vehicle is either in motion or not.

In addition to the foregoing described movements, the carrying platform is rotatably movable so that it can be rotated upwardly to a vertical plane to lie flush against the rearmost surface of the vehicle for storage purposes. Specifically, from the horizontal, parallel position described before, the carrying platform is rotatably pivoted so that the plane of the carrying platform is pivoted upwardly, through an arc of ninety degrees towards the rear of the vehicle, so that the plane of the carrying platform at this point stands vertically upright adjacent the rear of an automobile. This latter rotational movement to the vertical position is accomplished by the rotational movement of an intermediately disposed pivot member having a pivotal axis about which it rotates so that such intermediately disposed pivot member can in turn rotate the carrying platform from the horizontal to vertical positions described, and vice versa.

Obviously, the carrying platform is only pivoted to this vertically upright position when not carrying an object, as it is intended that such vertically upright position, adjacent the rear of the vehicle, serve as the storage position when the carrier itself is not in use.

In view of the foregoing, in its most general structural embodiment, the subject invention is comprised of a support structure protruding generally away from the vehicle, whether it be a side, front, or rear end attached carrier. Thus, the general embodiment applied to a carrier attached to any part of a vehicle, however, the general embodiment described below will be oriented to a rear end carrier for purposes of describing this general embodiment. The support structure protrudes rearwardly and is rigidly affixed to the vehicle and connects the carrier to the vehicle. Extending rearwardly from this support structure is a first pivotal member, and this first pivotal member is pivotally mounted about the support structure so that it can rotate from a vertically upright position to a horizontal position and vice versa. This first pivotal member thereby serves as the intermediate support member between the carrying platform and the support member, and also functions as the structural mechanism to move the carrying platform from the vertically upright storage position to the horizontal carrying position and back again to the vertically upright position, as the occasion dictates. The support frame for the carrying platform is a second pivotal member and is in turn pivotally mounted to the first pivotal member, so that the second pivotal member can rotate about the first pivotal member from the tilted down position to its horizontal carrying position, and back again to the tilted down position, as need dictates. It must be noted that the invention is constructed so that the second pivot member will pivot about the first pivot member to its respective described positions while the first pivot member is rotated downwardly to the horizontal position itself. Appropriately affixed locking mechanisms on each pivotal member are utilized to ensure that neither pivotal member will rotate when the respective other pivot member is not in appropriate position.

The invention is also equipped with a locking arm to lock the object onto the carrier when carried. Moreover, the carrying platform is equipped with various accomodating features to securely hold portions of the carried object, as the shape and size characteristics of the carried object dictate. Refined elements of the subject invention will be made evident in the following description of one preferred embodiment.

DESCRIPTION OF PREFERRED EMBODIMENT

In describing the preferred embodiment of the subject invention, the following definitions, reference points, and axes will be used. Specifically, since the preferred embodiment is a carrier for attachment to the rear of an automobile, the word "frontal" will be used in reference to the front area of an automobile, while the words "posterior" or "rear" will be used relative to directions towards the rear of such an automobile and generally extending towards a rearward direction therefrom. The words "longitudinal central axis" will refer to that axis which extends through the center, as seen in cross section, of an object from the one end to the other end thereof over is longest extent; or alternately stated from one extreme point to the most distal point therefrom. The word "longitudinal" or "longitudinally extending" shall mean extending more generally lengthwise in a given direction than otherwise. The word "transverse" will mean the lateral or width distance over a given object, which will be considered generally perpendicular to the longitudinal central axis. The word "upper" will refer to distances extending above and away from the ground and the word "lower" will refer to those areas extending towards the ground reference. In this latter respect the ground reference will be considered level or horizontal. Whenever the words "left" or "right" are used in the following description, they will be used, unless otherwise stated, in reference to an orientation of the left and right hand when one faces the back of the carrier from a position posterior to the carrier and automobile.

Referring now to the drawings, in which one preferred embodiment of the subject invention is shown, a carrier assembly 10, for a wheel chair 12, for attachment to the rear bumper 14 of an automobile 15 is shown. Thus, the carrier assembly 10 specifically described herein and shown in the drawings is particularly adapted to carrying a wheelchair 12, as represented. However, the principles and physical characteristics of the subject invention, with minor variations, are applicable to carrying various other types of objects, and there is no real limit in this regard except in cases of extreme weight or size. Moreover, the invention can be used on the front or side of an automobile or other land vehicle. Consequently, for the purpose of delineating a specific embodiment and application, a wheelchair carrier 10 is described hereinbelow.

Basically the carrier assembly 10 is comprised of five elements. Specifically, it has a rigidly affixed support member 20, a first pivotal member 33, a second pivotal member 50, a carrying platform 70, and a locking arm 110. The rigidly affixed support member 20, as shown in figures one and three is directly attached either permanently or semi-permanently to a bumper or other portion on an automobile 15. In the subject embodiment, the carrier 10 is attached to a rear bumper 14. Moreover, the fixed support member 20 is adaptable and intended for attachment to the rear end of any land vehicle, including automobiles. This rigid support member 20 is a rectangular shaped hollow member extending in a posterior direction from the bumper 14 of automobile 15 in a longitudinally extending manner with its longitudinal central axis A—A, as shown in figure four, being aligned parallel to the longitudinal, front-to-rear, central axis of the automobile 15. Pivotally mounted to the support member 20 is the first pivotal member 33, which first pivotal member is a longitudinally extending member which is structurally pivoted to one side of support member 20, so that the longitudinal, posterior extending component of said first pivotal member 33 rotates relative to said support member 20 in a vertically extending plane which is just offset from the longitudinal central axis A—A of the support member 20. The second pivot member 50 is in turn pivotally mounted on the first support member 33 and serves as the basic spinal support structure for the carrying platform 70, which platform is equipped to hold the object to be carried while said carrying platform is in a substantially horizontal position. This second pivot member 50 is a longitudinally extending rigid bar member rotatably mounted onto the first pivot member 33, so that said second pivot member can pivotally rotate about the longitudinal central axis B—B, as shown in figure four, of the first pivot member. The plane of rotation of the second pivot member 50 is substantially perpendicular to this longitudinal central axis B—B of the first pivot member 33.

By virtue of the structural relationship thusly described, the carrier 10 has two pivot connections. One such pivot connection permits carrying platform 70 to first rotate up and down, between vertically upright and horizontal positions, about a transverse axis D—D. This transverse axis D—D is parallel to the ground and extends transversely through fixed support member 20 in a direction perpendicular to the longitudinal central axis A—A of said fixed support member 20. Secondly, the second pivot member 50, and thus carrying platform 70, can also rotate about the longitudinal central axis B—B, shown in figure four, of the first pivot member, so as to cause second pivot member 50, and thus carrying platform 70 to be tilted from a level horizontal position parallel to the ground to a downwardly inclined position with one end touching the ground, as described heretofore. This latter movement of second pivot member 50 allows the carrying platform 70 to be lowered to the ground with one end touching the ground, or nearly so, so that said carrying platform 70 can serve as an inclined plane as an aid in the process of loading the object onto the carrying platform 70 itself. From this latter tilted position, the carrying platform 70 can be thusly pivoted upwardly to a position horizontal or level with the ground while the object is thereon. It is in this latter substantially horizontal position that objects carried thereon are appropriately locked on the carrying platform 70 on carrier 10. When the carrying platform 70 is not being used it is stored by pivoting it, as described above, from the aforesaid level horizontal position, shown in figures one and two, to the vertically upright position as shown in figure three, and then appropriately locked in place for unobtrusive compact storage at the rear of the automobile. It must be clarified at this juncture in the description that it is the movement and positioning of the second pivot member 50 which determines the movement of carrying platform 70, as can be seen in the drawings carrying platform 70 is solely dependent on second pivot member 50 for support and motion.

The preferred embodiment as generally described above is constructed as particularly described below. In this respect, it must be stressed that the following description is of only one possible preferred embodiment, and the exacting structural characteristics are not to be construed as the only physical features and constructional arrangements that can be used to accomplish the objectives of the subject invention.

As stated above, the subject carrier assembly 10 is most feasibly affixed to the rear bumper 14 of an automobile 15, as represented in the drawings. However, as discussed before, it is to be understood that the subject carrier 10 is not limited to attachment on a rear bumper, or any bumper at all, so long as any suitable method is used to affix the carrying assembly 10 to the vehicle in question. In this respect, it is to be noted that whenever the carrier 10 is attached to the rear of an automobile, the longitudinal posteriorly extending distance of fixed support member 20 is sufficient to offset the remaining parts of carrier 10 so that a trunk lid on automobile 15 can be readily accessible and opened.

The preferred device for secure attachment of the carrier 10 through support member 20 to the automobile 15 is by a bumper collar assembly 21 which is structured to partially encircle and rigidly clasp the conventionally disposed rear bumper 14, as shown in figures two and three. Projecting longitudinally and rearwardly from the collar assembly 21 is a substantially flat and rigid rectangular tongue 22 of horizontal disposition, as shown in figure five. Appended to the upper surface of such tongue 22 is a vertically protruding bolt 23 which is structured to fit upwardly through vertically disposed coaxial openings 24A and 24B, located on the upper and lower portions respectively of the frontal area of fixed member 20. After bolt 23 is inserted upwardly through openings 24A and 24B, the upper portion of such bolt is secured by a T-handled cap nut 25 machined with mating threads on its interior surface to readily thread and lock onto bolt 23 upon appropriate tightening. The lower face of the support member 20, when carrier 10 is attached to collar 21, lies directly upon the upper surface of tongue 22 and is secured thereto as described. Additionally, at the base the tongue 22 is a transversely extending anti-sway bar 28 of polyhedron shape welded thereto as shown in figure five. This anti-sway bar 28 serves to prevent lateral swaying of the carrier 10 when the automobile 15 is moving.

The bumper collar 21, as particularly represented in figures two, three, and five is equipped with upper and lower extending straps 26A and 26B respectively, made of either metallic or other suitable composition. Straps 26A and 26B serve to partially encircle and clasp the upper and lower portions respectively of the bumper 14, as shown in figures two and three. Moreover, straps 26A and 26B once placed around the bumper 14, as shown, are locked in place by a locking bolt 27, which upon minimal tightening will tighten the grip of each strap 26A and 26B. Thus, in brief, the fixed support member 20 of the carrier 10 is fixedly secured to the automobile 15 by inserting bolt 23 through openings 24A and 24B, securing locking cap 25 on bolt 23, thereby rigidly securing the support member 20 to the bumper 14. Thus affixed to the bumper collar 21, the support member 20 is rigidly and securely attached to the bumper 14, and in this rigidly affixed position and support member 20 is adapted to function as the primary holding and weight support member for the carrier 10.

The fixed support member 20, as generally described above is a parallelopiped shaped member of hollow disposition, the bases of which are rectangular; and thus when viewing it from any direct elevational view it appears rectangular in disposition. The precise parallelopiped feature of support member 20 is not critical to the construction of the preferred embodiment, however. Additionally, fixed support member 20, locked to the bumper collar 21 lies generally parallel to the ground when the automobile is resting on flat terrain, with the longitudinal central axis A—A, shown in FIG. 4, of said fixed support member being parallel to the ground. More specifically, the longitudinally posterior projection of support member 20 is such that its longitudinal central, front-to-posterior, axis A—A lies parallel to the longitudinal central, front-to-posterior, axis of the automobile 15, but such two axes are not necessarily congruous with one another. For purposes of constructing the preferred embodiment, fixed support member 20 is preferably made of treated steel because of the obvious strength requirements for its intended functions.

Integrally affixed, by welding or other suitable means, to the right side of fixed support member 20, as viewed from the posterior side thereof toward the front, is vertically extending flanged plate member 31 of basically rectangular disposition. In particular, flanged plate 31 as shown in figures four and five, as viewed from a posterior elevation of support member 20, is integrally affixed to the right side of the posterior area of fixed support 20, so that its one surface lies flush in a fixed relationship against the right side of fixed support member 20. A portion of flanged plate 31 extends and protrudes vertically up from the upper surface of the right side of support member 20. Figure five represents in some detail the structure of this flanged plate 31 and shown in such view is the distance which flanged plate 31 extends above the upper surface of support member 20. A circular configured opening 30, bored to receive a circular shaft, extends transversely through the posterior end of fixed support member 20, as shown in figures four and five. The longitudinal central axis D—D of such circular opening 30 lies horizontal and parallel to the ground and is generally perpendicular to the longitudinal central axis A—A of support member 20, as represented in FIG. 4. The circular bored opening 30, is machined transversely through support memeber 20 so that it is adapted to receive one leg of first pivot member 33, which is circular in its peripheral disposition, for rotational movement of said leg 35 about the longitudinal axis D—D of said opening. The bored opening 30 is thus the first pivot structure for carrier 10, and serves as the initial pivot point when the carrier is unfolded from storage.

Two additional circular openings 32A and 32B of equal diameter are disposed in flange 31, with opening 32A being disposed vertically above opening 30B in flange 31 and opening 32B being disposed horizontally in front of opening 30B in the same horizontal plane as said opening 30B. Both openings 32A and 32B as machined into flanged plate 31 are appropriately bored for reception of the end of a circular bar member which is to be inserted therein for locking purposes, as described below. Moreover, each such circular opening 32A and 32B is located the same distance from opening 30, with the centers of the latter three openings forming the respective corners of an isosceles triangle, with a base between openings 32A and 32B. As a result of the respective positions of openings 32A and 32B relative to opening 30 and one another, openings 32A and 32B are spaced over an arc of ninety degrees from one another, as shown. A vertically extending flange leg 34 is integrally affixed to the posterior end of flanged plate 31, which flange leg 34 extends perpendicular to the longitudinal body of flanged plate 31. This perpendicular relationship can be determined by viewing figure four, and when so viewed in elevation, flanged plage 31 and leg 34 form an L-shaped member.

First pivot member 33 is, as described above, pivotally mounted to the fixed support member 20, and in this regard serves as the intermediate support structure holding both the second pivot member 50 and the carrying platform 70; and said first pivot member 33 also serves as the first pivotable structure, as discussed. This first pivot member 33 is basically an L-shaped member being comprised of two longitudinally extending rounded bar members 35 and 36. These latter two rounded bar members 35 and 36 are joined at their respective ends in a mutually perpendicular relationship, as represented in figures four and five, and this mutually perpendicular relationship between bar members 35 and 36 forms thereby the L-shaped configuration for first pivot member 33 shown in figure four. Leg 35 of first pivot member 33 is the actual pivotable and rotatable member of said first pivot member 33 and as such is inserted longitudinally and axially through bore opening 30, placed in fixed support member 20 and flanged plate 31 respectively, as shown. The longitudinal central axis of circular opening 30A thence coincides with the longitudinal central axis for inserted leg 35, and this axis D—D is the axis of rotation for leg 35.

Integrally affixed, by welding or otherwise, to leg 35 of first pivot member is a flat plate 37A of substantially rectangular disposition, as represented in figures two and three. More particularly, plate 37A is integrally attached to leg 35 so that the one end of such plate encircles leg 35 in a fixed relationship, as shown in the drawings. Therefore, since plate 37A is not rotatable relative to leg 35, plate 37A rotates with leg 35 as a fixed entity, and, as a direct result, the end of plate 37A will rotate the same arcuate distance as does leg 35. Therefore, the longitudinal central axis of plate 37A if extended in a posterior direction extends through the leg 34 of flanged plate 31. Thus, when the plate 37A is moved to a vertically upward position its posterior edge abuts directly onto leg 34, as evidenced from the view of FIG. 4. The frontal, inner portion of leg 34 of flanged plate 31 thus serves to limit the movement of plate 37A beyond the posterior extent of flanged plate 31. Alternatively stated, the leg 34 limits the posterior movement of plate 37A to the vertically upward position shown in figures two and three. This limiting effect of leg 34 serves to limit the posterior counterclockwise movement, as viewed in figure four, of plate 37A and this limits the rotational movement of leg 35 and thusly the rotation of first pivot member 33 in its posterior revolution, from the position shown in figure three to the position shown in figure two. Machined into plate 37A is a transversely extending opening 37B of vertical disposition. This circular opening 37B is situated on that portion of plate 37A which is opposite to that area which is affixed around leg 35, as shown in figures two and three.

Integrally affixed to the right, exposed face of plate 37A, as viewed in figures five and six, is a locking device comprised basically of a cylinder 38A equipped with a spring biased locking rod 39. More particularly, cylinder 38A is of hollow disposition with the center thereof being machined of a cylindrically shaped bore 38B to receive rod 39 therein, as shown in figure six. The bore 38B within cylinder 38A is open on each end of cylinder 38A and rod 39 is adapted to slide back and forth, in an axial movement, along the length of the bore 38B, as readily determined by a view of figure six. The one end of cylinder 38A, and specifically the left end as seen in figure six, is welded to the exposed face of plate 37A such that the bore of said cylinder is coaxially aligned with circular bore 37B in plate member 37A. Since bore 37B and bore 38B are aligned with the circumference of bore 38B being sufficient to receive rod 39, rod 39 can slidably fit through both bores 38B and 37B, as shown in figure six. Moreover, the bore 37B in plate 37A is located in a position on plate 37A so that when plate 37A is vertically up and down, as shown in figure two, the bore 37B is aligned coaxially with opening 32A in flanged plate 31, and also when flange 37A is in the horizontal position shown in figure three, the bore 37B is aligned coaxially with the opening 32B. These respective vertical and horizontal positions of plate 37A, as aligned with openings 32A and 32B serve as the respective locking positions for first pivot member in horizontal positions respectively as will be discussed in more detail below.

The right end of rod 39 extends out beyond the outside of cylinder 38A and this right end of rod 38A is equipped with a T-shaped handle 41, said handle being provided to facilitate the axial movement of rod 39 in cylinder 38. Encircling that part of rod 39 within bore 38B is a helically would spring 40, the left end of which is seated against a pin 42, fitted transversely through rod 39 within the confines of bore 38B, and the opposite end of spring 41 is seated against the right end of bore 38A. Thusly seated against pin 42 and the right end of inner bore 38B, the helical spring 40 serves to push rod 39 by this spring load to the left and towards plate 37A and into bore 37B and whichever opening 32A or 32B the bore 37B is aligned with. Therfore, whenever plate 37A is aligned in the vertical position shown the bias of spring 40 will urge the rod 39 through bore 37B into opening 32A, and this bias of the spring will serve to keep the rod in the opening 32A. This latter positioning of rod 39 will serve to lock plate 37 in the vertical position, and in this vertical position the first pivot member 33 is in the horizontal positioning for holding the second pivot member 50 are the carrying platform in the horizontal position. When the plate 37A is to be rotated forwardly from the vertical position to the horizontal position shown in figure three the handle 41 is pulled outwardly to overcome the bias of spring 40 in order to disengage rod 39 from the opening 32A. This unlocks the plate 37A from the vertical positions so that it can be thence rotated forwardly through a ninety degree arc to the horizontal position. The leg 35 will rotate the same arcuate distance as does plate 37A since they are integrally affixed as shown. The rotational movement of leg 35 in turn causes the rotational movement of first pivot member 33. Once the plate 37A is in the horizontal position, as shown, the bore 37B becomes aligned with opening 32B, the rod 39 will be urged automatically into such opening 32B because of the bias of spring 40. Once so inserted in opening 32B, the rod 39 locks plate 37A and thus first pivot member 33 in the vertical position, carrying therewith also to the vertical position the carrying platform 70. The locking device in the form of cylinder 38A and rod 39 serves as the means to lock the first pivot member 33 in one of the appropriate two positions. As an auxiliary locking means, the plate 37A is blocked from further posterior rotation by the protrusion of leg 34 into the posterior path of such plate 37A. This prevents the movement of plate 37A beyond the vertical position.

Welded near the posterior end of leg 36 of first pivot member 33, is a plate member 44 of substantially rectangular configuration. This plate 44 has a circular opening 45B machined therein, and such opening is spaced away from the leg 35 a given distance. The functional relationship and purposes of this positioning of opening 45B will be discussed in further detail below.

The plate 44 as welded to leg 36 of first pivot member 33 is made an integral portion of such leg 36 in the same manner as plate 37A is affixed to the leg 35. Specifically, the lower area of plate 44 encircles leg 36 in a fixed relationship so that plate 44 and leg 36 rotate together as a unit.

Second pivot member 50 is a longitudinally extending member which has a parallelopiped shape, such that a cross-sectional configuration thereof is square as viewed in the end elevational view shown in figure three. The longitudinal central axis of second pivot member 50, which is C—C, as shown in figures four and five, extends perpendicular the longitudinal central axis B—B when the second pivot member 50 is attached to the first pivot member 33. Thus second pivot member 50 is structured and positioned to rotate in a directional plane perpendicular to axis B—B about first pivot member 33. In order to accomplish this latter rotational movement second pivot member 50 is provided with a flanged member 51 affixed to the bottom surface of said second pivot member 50. The upper rib of this flanged plate member 51 is welded or otherwise permanently affixed such that the upper surface of such rib lies flush against the undersurface of such second pivot member 50, as shown in figure three.

As affixed to each other, the upper surface of said rib of flange member 51 is parallel to the lower surface of the second pivot member, and the lower rib of flange 51 lies perpendicular to the upper rib and is joined to the upper rib at the frontal edge of said upper rib. Transversely machined through the lower rib is a circular opening which is coaxially aligned with a transversely extending bored sleeve member 52. The sleeve 52 is welded adjacent said opening on the posterior side of lower rib of flange 51, as shown in FIGS. 5 and 7, as is integrally fixed to said rib, the opening of said rib and the bored sleeve 52 as coaxially aligned, receive the end of circular leg member 36. Sleeve 52 and the lower rib of flange 51 is thus rotatably mounted about leg 36, and as a result the sleeve 52 serves as both the support medium and pivotal connection between the first pivot member 33 and second pivot member 50. The sleeve 52 permits the second pivot member 50 to freely rotate about the B—B axis of the leg 36, however, such rotational movement of the second pivot member 50 is constrained by a locking mechanism hereinbelow more fully described. Axial movement of sleeve 52 along leg 36 is restrained by a radially extending pin 46 located on leg 36, while movment of the sleeve in a frontal axial direction is limited by the restraining effect of plate member 44 on leg 36. Therefore, the second pivot member 50, affixed to leg 36 of the first pivot member through the flange 51 and sleeve 52, as described immediately above, is limited to simple rotational movement about the longitudinal central axis B—B of leg 26, wherein the plane formed by the rotational movement of the longitudinal second pivot member 50 is perpendicular to said longitudinal central axis B—B of leg 36.

The lower rib of flange 51 is provided with an additional transversely extending opening 45A machined through said lower rib in an axial direction parallel to the axial direction of sleeve member 52. This additional transversely extending opening of circular configuration is spaced away from said sleeve 52 towards the right side of said lower rib, as viewed in figure seven. Correspondingly, located on the right side of plate 44 is a circular opening 45B. Opening 45B is spaced a distance from the opening in plate 44 which receives sleeve 52, which distance is the same distance that circular opening 45A is away from the sleeve member 52. Alternately stated openings 45A and 45B are aligned in a coaxial manner whenever the second pivot member 50 is situated in the horizontal position shown in figures one and two. When second pivot member 50 is in this horizontal position, the bottom edges of plate 44 and flange 51 are aligned evenly as shown in figure two.

Affixed to the lower rib of flange 51 is a cylinder 55, similar in constructional configuration and operation to locking cylinder 38A on plate 37A on the first pivot member. Locking cylinder 55 is aligned on flange 51 on pivot member 50. Disposed longitudinally through locking cylinder 55 is a rod 56 which was a helically wound spring 57 disposed therearound as shown in figure four. A handle 58 on rod 56 is used to pull rod 56 inside the cylinder 55 to overcome the bias of spring. A pin 59 seats spring within the cylinder in the same manner as spring pin 42 in locking cylinder 38. The cylinder 55 is constructed otherwise in the same manner as locking cylinder 38 and operates in the same manner as said locking cylinder 38. Specifically, frontal end of rod 56 is adapted to fit through circular opening 45A in the lower rib of flange member 51, and under the normal bias of spring 57 said frontal end of rod 56 will be urged into and stay within the circular opening 45B of the plate 44 on leg 36 of first pivot member 33. In this disposition, wherein the frontal end of rod 56 is inserted through both openings 45A and 45B the plate 44 and flange 51 become locked together, and in this locked relationship second pivot member 50 is locked in the horizontal position on leg 36, as shown in figures one and two. In order to unlock the second pivot member 50 from this horizontal position, the handle 58 is pulled in a posterior direction to overcome the bias of helical spring 57, and when pulled sufficiently in a posterior direction, the frontal end of rod 56 is disengaged from the circular opening 45B. This serves to release flange 51 from plate 44 and the second pivot member 50 is free to rotate and tilt downwardly in a counterclockwise rotational movement, as viewed in figures five and seven. As stated above, when rotated to the tilted downward position, the carrying platform 70 is also tilted downwardly accordingly. It is to be noted that there is no circular opening for the frontal end of rod 56 to be inserted in when it is disengaged from opening 45B; and this therefore permits the second pivot member 50 to tilt downwardly, without locking, any rotational degree that is necessary for the left end of the carrying platform 70 to reach the ground. The latter unrestrained rotational movement of the first pivot member is intended to accommodate the problem of variable heights above the ground of the carrying device 10, since the automobile 15 weight may vary such height.

Mounted on the upper surface of second pivot member 50, as shown in figures four and five, are the appurtenances thereon which comprise carrying platform 70. Specifically, mounted on the left end of second pivot member 50, as seen in figures four and five, are a pair of wheel holders 90A and 90B for the larger rear wheels 100A and 100B of wheelchair 12. Wheel holders 90A and 90B are retaining bar member each of substantially trapezoidal shape as viewed from a top elevational view, such as the one represented in figure four. The general functions of wheel holders 90A and 90B are to encircle a portion of the bottoms of rear wheels 100A and 100B in a manner as represented in figure one. It can be seen from the drawings that the end of second pivot member 50 on which wheel holders 90A and 90B are affixed is the end which is closest to the ground when carrying platform 70 is lowered.

On the right end of pivot member 50, which is opposite to the end wheel holders 90A, 90B are mounted, are front wheel holders 91A and 91B, which two members serve as the remaining appurtenances of carrying platform 90. Front wheel holders 91A and 91B are simply steel rods conformed to a triangular disposition, as seen in the top elevational view of figure four. These front wheel holders 91A and 91B serve as holders for the smaller front wheels 102A and 102B of wheelchair 12, as seen in figure one. Moreover, the wheel holders 91A and 91B are each provided with depressed U-shaped stirrup members 92A and 92B respectively integrally welded thereto; and these stirrup members 92A and 92B serve to seat and hold the extreme bottom portions of the front wheels 102A and 102B of wheelchair 12 in order that these front wheels can be held more firmly on the carrying platform 70. Front wheel holders 91A and 91B, with their respective stirrup members 92A and 92B, are both welded to a slidable sleeve member 95 which is adapted to be axially moved left or right on second pivot member 50 so as to adjust the longitudinal distance between the back wheel holders 90A and 90B and the front wheel holders 91A and 91B. A threaded locking pin 96 is inserted through the side of sleeve 95 so that the sleeve can be locked against second pivot member 50 at the desired interval along the second pivot member 50. So locked against axial movement along second pivot member 50, the sleeve 95 yields a degree of flexibility needed for various sized wheelchairs.

As stated above, transversely extending leg 35 of first pivot member 33 extends through bore 30 of support member 20 and is rotatable therein subject to the limits imposed by leg 34 of flange 31 against plate 37 on said leg 35. Both ends of circular leg 35 protrude out beyond the respective ends of bore 30, as shown in figure six.

The left end of leg 35, as extending beyond bore 30, is pivotally mounted to longitudinally extending locking bar 110, as represented in figures five and six. Locking bar 110 is designed to lock the wheelchair 12 into place so as to be securely held on carrying platform 70. Specifically, locking bar 110 is affixed to leg 35 as an articulated extension of said leg 35. Locking arm 110 is comprised basically of two longitudinally telescoping members 112 and 114 which extend locking arm horizontally to the left, as seen in figure six, or vertically upright, as seen in phantom in figure six. Member 114 is the outer member and is adapted to slide axially back and forth within the hollow confines of inner member 112, and a transversely extending pin 122 serves to lock these two telescoping members once the desired length of locking bar member 110 is effected by relative axial movement of the two members 112 and 114 in respect to one another.

The left extreme end of member 114 is provided with an angled metal plate 116 which functions to provide supplementary lateral reach for the locking arm 110 for purposes of effecting a more efficient hold on the object to be carried on carrier 10. At the extreme end of angle iron 116 are parallel u-shaped prongs which are structured to depend vertically downwardly when the locking bar 110 is in a vertical position. The base for such prongs 118 is affixed to end of angle iron 116 as shown in figure four. Each of the prongs of holder 118 will be inserted over the respective sides of larger wheel 100A of the wheelchair 110 in order to firmly hold the wheel and thus the wheelchair in place. Moreover, integrally affixed to the locking arm 110, at the base of angle iron 116, as shown in figure four is a metallic loop 120 adapted to receive a chain for locking any portion of the wheelchair 12 to carrier 10.

As stated above, the locking arm 110 is articulated relative to leg 35. Specifically, transverse pin 132 locks member 112 of locking arm 110 to leg 35, as shown, so that locking arm 110 can articulate up or down about leg 35, as represented in FIG. 6. By virtue of the arcuate surface on the end of leg 35 which joins locking arm 110, the bias of helical spring member 134 interposed around that portion of leg 35 between support member 20 and locking bar 110, the locking bar 110 will be stabilized only in either the vertical or horizontal positions shown.

The subject carrier 10 operates as follows: Starting from a stored position as shown in FIG. 3, in which the carrying platform 70 of pivot is in a vertically upright position, the first step is to pull out on handle 41, pulling against spring 40, and as handle 41 is pulled outwardly it disengages the end of rod 39 from opening 32B. This serves to unlock the first pivot member 33 from its vertically upright position, shown in figure three. Next the first pivot member 33 is rotated down in a posterior direction away from automobile 15 to a level, horizontal position, as shown in figures two and five. Once first pivot member 33 is lowered to this horizontal position it is locked in place by two mechanisms. First, this posterior travel, which is a counterclockwise movement shown in figure three, is halted by leg 34 of flanged plate 31. Secondly, first pivot member is locked in place by the action of spring 40 urging the left end of rod 29 into opening 32A when the first pivot member 33 is rotated back to the stop point where rod 39 meets hole 32A. The bias spring 40 will act automatically to urge rod 39 into the hole and will keep rod in hole 32A in a locking relationship. This position of plate 37A is the vertical position shown in figure two when the first pivot member 33 is in the horizontal position.

Movement of the second pivot member 50 and the carrying platform 70 thereon also to the horizontal position shown in figures two and three, is accomplished by the movement of the first pivot member 33, as the movement of the first pivot member determines whether the second pivot member is in the vertical or horizontal positions. Once the carrying platform 70 is moved to the horizontal position, it is to be lowered to an inclined position as shown in FIG. 5 in order to commence the loading operation. This lowering to an inclined position is accomplished by unlocking the second pivot member 50 from the first pivot member. This is accomplished by pulling out the handle 58 from cylinder lock 55, which action compresses spring 57, and pulls rod 56 out of opening 45B shown in figure seven. Thusly unlocked the second pivot member and thus the carrying platform 70 is allowed to rotate downwardly, as shown, and in this lowered position, the wheelchair 12 is moved onto the carrying platform 12, with the wheels inserted in the holders 90A, 90B, 91A and 91B, and once so loaded, the carrying platform 70 through second pivot member 50 is rotated back to the level position where the wheelchair is carried. Locking device 55 is engaged and the carrying platform 70 and first pivot member 50 are locked in the horizontal positions. The locking arm 110 then is engaged to hold the wheelchair 12.

The foregoing description is of a preferred embodiment, and it must be noted that any one of the structures in the embodiment just described can be varied in shape or constructional feature without going beyond the compass of the subject invention. For instance, a carrying platform 150, as shown in FIG. 8, can be an alternate embodiment, as one of many variations, and the objects can be loaded simply onto this flat platform. The following claims are thus not to be limited by a specific construction and description.

What is claimed is:

1. A carrier for external attachment to a land vehicle to carry objects with wheels externally to said vehicle and wherein said land vehicle has a central longitudinal axis extending from the front to back of said vehicle comprising:
   a. a fixed support member attached externally to said land vehicle said fixed support member protruding rearwardly from said land vehicle;
   b. a first pivot member of rigid construction, said first pivot member being pivotally mounted to said fixed support member and rotatable clockwise and counterclockwise in a ninety degree arc about a first axis extending through said first pivot member, said rotation being between a vertical storage position and a horizontal carrying position and wherein said first axis is perpendicular to the central longitudinal axis of said land vehicle;
   c. a second pivot member of rigid construction, said second pivot member being pivotally mounted to the first pivot member for rotational movement about a second axis through said first pivot member, said second axis being parallel to the central longitudinal axis of said land vehicle;
   d. means affixed on said second pivot member for carrying objects, said means comprising metallic bar members formed into a polygonal perimeter configuration, said metallic bar members being open in the center to receive the bottom of one or more wheels of the object to be carried;
   e. means on said second pivot member to lock same in a horizontal position relative to said first pivot member and said fixed support member.

2. A carrier for objects with wheels, said carrier adapted for facilitating the loading of the object and further adapted for attachment to a land vehicle having a longitudinally extending central axis extending from the front to back of said land vehicle, said carrier comprising:
   (a) a rigid support member affixed externally to the rear of said land vehicle;
   (b) a first pivot member pivotally mounted to said support member, said first pivot member rotatably mounted in a pivotal mounting for rotational movement between a horizontal carrying position substantially parallel to the ground, and a vertical position, and wherein said first pivot member pivots about an axis perpendicular to the longitudinal central axis of said land vehicle;
   (c) a second pivot member pivotally mounted to at least one portion of the first pivotal member, said second pivot member pivotally mounted to said pivot member about an axis which is parallel to the longitudinal central axis of said land vehicle, said pivotable movement of said second pivot member being between a horizontal carrying position and an downwardly tilted position for loading said object;
   (d) carrying members integrally affixed on said second pivot member, each said carrying member having insert members to receive a portion of one wheel of the carried object;
   (e) locking means on said carrier to secure the carried object to the carrier;
   (f) length adjustment means connected to one or more of said carrying members on said second pivot member, said adjustment means comprising a sleeve slidably mounted on said pivot member for axial movement along said second pivot member.

3. A carrier for objects with wheels, said carrier adapted for attachment to the back side of a land vehicle wherein said land vehicle has a longitudinally-central axis extending from the front to rear of said land vehicle, said carrier comprising:
   (a) a rigid support member affixed to the back of said land vehicle and projecting horizontally therefrom;
   (b) a first pivot member of rigid construction mounted through a pivot member in said rigid support member wherein the first pivot member carries a position locking means on said first pivot member, so as to limit arcuate rotation of said first pivot member to a ninety degree arc from a vertical storage position to a horizontal carrying position;
   (c) a second pivot member of rigid construction pivotally mounted to said first pivot member, said second pivot member having on the upper portion thereof a plurality of holding members which are comprised of polygonally shaped perimeters and depressed portions in the middle thereof to hold one or more of the wheels of said carried object, said second pivot member being rotatable between a horizontal carrying position and a tilted loading position;
   (d) first, locking means affixed to said second pivot member, said first locking means comprising a retractible spring loaded bolt to lock said second pivot member against movements relative to said first pivot member;
   (e) a second locking means affixed to said fixed support member, said second locking means comprising a pivotable bar member pivotally mounted to said first pivot member.

* * * * *